United States Patent [19]

Harlow

[11] 4,387,329

[45] Jun. 7, 1983

[54] THREE PHASE POWER-FACTOR CONTROL SYSTEM FOR A.C. INDUCTION MOTORS

[75] Inventor: John R. Harlow, Richmond, Va.

[73] Assignee: Electronic Assemblers Company, Richmond, Va.

[21] Appl. No.: 132,568

[22] Filed: Mar. 21, 1980

[51] Int. Cl.$^3$ ............................................. H02P 5/40
[52] U.S. Cl. .................................... 318/729; 318/798; 318/809
[58] Field of Search ............... 318/729, 805, 809, 812, 318/798, 480, 313; 328/134; 323/300

[56] References Cited

U.S. PATENT DOCUMENTS

| | | | |
|---|---|---|---|
| 3,387,196 | 6/1968 | Graham et al. | 318/812 X |
| 3,441,823 | 4/1969 | Schlabach | 318/221 |
| 3,506,899 | 4/1970 | Graham | 318/812 |
| 3,529,224 | 9/1970 | Bedford | 318/237 |
| 4,052,648 | 10/1977 | Nola | 318/812 |
| 4,052,651 | 10/1977 | Kamaike | 318/812 |
| 4,260,948 | 4/1981 | Okado | 323/241 |
| 4,266,177 | 5/1981 | Nola | 318/812 X |

OTHER PUBLICATIONS

Kenly et al, "Trial Speed Control of Three Phase Induction Motor With Phase-Locked Loop Regulation", IEEE Transactions on Industry Applications, Vol. 1A-12, No. 5, pp. 492-498, Sep.-Oct. 1976.
"Improved Power Factor Controller", Marshal Space Flight Center, Alabama, NASA Tech. Briefs, Summer 1980.

Primary Examiner—David Smith, Jr.
Assistant Examiner—G. Z. Rubinson
Attorney, Agent, or Firm—Griffin, Branigan & Butler

[57] ABSTRACT

A three-phase power factor control system for an AC induction motor (10) monitors the power factor of a first-phase motor winding and produces a rectangular-wave pulse power-factor signal (f) which is used to directly control the duration of "on" time of each cycle of input power to the first-phase winding and to indirectly control the "on" time of each cycle of input power to second- and third-phase windings. To provide a signal for controlling the power to second- and third-phase windings the power-factor pulse signal is synchronized with a square-wave oscillator (30) whose frequency is three times that the power-factor pulse signal. Each second and third positive pulse (38 and 40) of the square-wave oscillator (30) is used to control the "on" time of each cycle of input power to the second- and third-phase windings.

A current sampler (72) for monitoring current flowing through the first-phase winding samples voltage across a triac and thereby avoids unduly loading the first-phase winding with a resistor as was done in the prior art. The current sampler (72) is coupled to following circuits through an optical isolator (74) for producing pulses corresponding to current phase.

15 Claims, 18 Drawing Figures

THREE PHASE POWER-FACTOR CONTROL SYSTEM FOR A.C. INDUCTION MOTORS

BACKGROUND OF THE INVENTION

This invention relates to power input controls for motors, and particularly to a power-input control for a three-phase AC induction motor which provides power proportional to loading on the motor.

So far as prior art is concerned, this invention is related to the invention described in U.S. Pat. No. 4,052,648 to Nola. The Nola patent describes a control system for AC single-phase induction motors which monitors the power factor (cos of the phase difference between the voltage signal applied to the motor's winding and current drawn by the winding) and utilizes the phase difference to inversely vary the duration of "on" time of each cycle of input power to the motor. Thus, when the motor's load is decreased, and its phase angle increases, the system described in the Nola patent reduces the "on" time of each cycle of input power to the motor to save energy. The information contained in the Nola patent is hereby incorporated herein by reference. In Column 4, beginning at line 62 of the Nola patent, Nola suggests that his invention could be used with a three-phase induction motor by using three of his control systems, each being connected in one of the three phase windings. In fact, such arrangements have proven to be impractical in that they require multiplicity of expensive parts and do not work efficiently, and with stability, because of a lack of proper isolation between certain circuit subsystems. Thus, it is an object of this invention to provide a power-factor control system for induction motors that has proper isolation between circuit subsystems and which works effectively, and with stability.

Another problem with three-phase, power-factor control systems for induction motors suggested in the prior art is that they must be coupled to the neutrals of wye connected induction motors, which are sometimes difficult to reach. Thus, it is an object of this invention to provide a three-phase, power-factor control system for induction motors which can be utilized to effectively control the power consumption of motors without gaining access to the motors' neutral terminals.

It is also an object of this invention to provide an effective power-factor actuated control system for multi-phase AC induction motors.

It is also an object of this invention to provide a power-factor control system for multi-phase motors which is accurate in operation and practical to build and install.

SUMMARY OF THE INVENTION

According to principles of this invention, the power factor of a first-phase winding, of a three phase motor for example, is monitored and a pulsed power-factor signal is thereby produced. The pulsed power-factor signal is used to directly control the "on" time of power fed to the first-phase winding and is indirectly used to control power fed to the second- and third-phase windings. With regard to the second- and third-phase windings, the pulsed power-factor signal, which is indicative of the power factor of the first-phase winding, is used to create a synchronized pulsed signal which has a frequency three times greater. Each second and third pulse of this synchronized pulse signal is respectively used to control the "on" times of the second- and third-phase windings of the three-phase induction motor.

A current sampling circuit measures current across a power-controlling triac in series with the first-phase winding and is isolated from following subcircuits by an optical isolator.

In one mode, the voltage sampling circuit samples voltage across only the first-phase winding, but in another mode, it samples voltage between two phase source terminals; thus, across the first phase winding and one of the second- or third-phase windings in series therewith.

DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts throughout different views. The drawings are not necessarily to scale, emphasis instead being placed upon illustrating principles of the invention.

DETAILED DESCRIPTION OF THE PREFERRED EMBODIMENT

Figure 1:
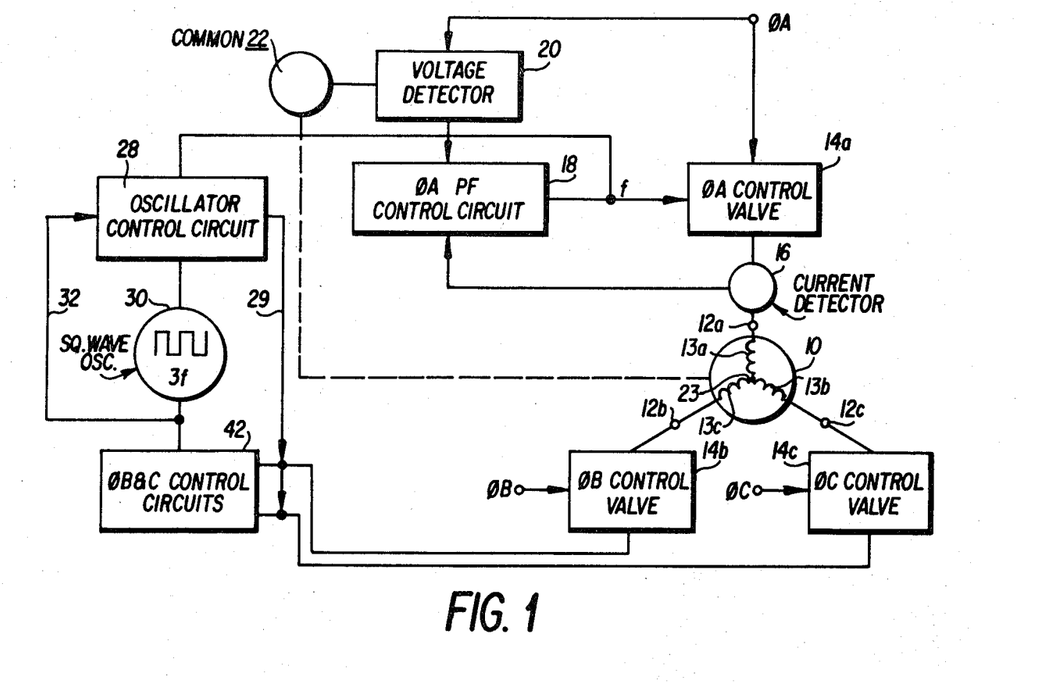
FIG. 1 is a block diagram of a simplified three-phase power factor control system of this invention coupled to an induction motor.

Describing first the simplified circuit of FIG. 1, a wye-connected induction motor 10 has first-, second-, and third-phase terminals 12a, 12b, and 12c associated with windings 13a, 13b and 13c. The induction motor 10 is powered by line voltages $\phi A$, $\phi B$, and $\phi C$, each of which is coupled to the respective first-, second-, and third-phase terminals 12a, b, and c through its respective electronic control valve 14a, b, and c, all of which are part of a control circuit of this invention.

The power-factor system for controlling the power supplied by $\phi A$ to the induction motor 10 at terminal 12a is quite similar to the system described in U.S. Pat. No. 4,052,648 to Nola however, there are major differences which will be described below in reference to FIGS. 3 and 4. With respect to similarities, a current detector 16 detects the current flowing from $\phi A$ power supply to the terminal 12a and provides a signal indicative thereof to $\phi A$-PF control circuit 18. Similarly, a voltage detector 20 detects the voltage of $\phi A$ by measuring across a source for a first-phase induction motor winding (the winding associated with terminal 12a) with a common lead 22. In the case of a wye-connected three-phase motor, lead 22 can be connected to the neutral 23, that is the intersection of the three windings 13a–c, and in the case of a delta-connected motor, it can be connected to the selected intersection of two windings. However, a significant feature of this invention is that it can also be merely connected to the common of the power source, or, in effect, for wye connected motors, across φA and φB or φC windings. The voltage detector 20 provides a signal indicative of the voltage appearing across this winding to the φA-PF control circuit 18. The φA-PF control circuit 18 furnishes a rectangular-wave pulsed power-factor signal f (FIG. 2a) indicative of the current/voltage phase difference of the first-phase winding to inversely control the "on" time of the φA control valve 14a (a triac in the preferred embodiment). Thus, where the power factor is optimum (of the desired efficiency) the φA control valve 14a remains "on" all the time. However, when a load is taken away from the induction motor 10, thus increasing the phase angle, the signal applied by the φA-PF control circuit 18 is used to reduce the average amount of current supplied to the appropriate winding of the induction motor 10. In this respect, plot 2a depicts a power-factor signal f. Beginning at $t_0$, the power-factor signal is pulsed 26 and, beginning at $t_1$, it is a continuous signal 24 which is supplied by the φA-PF control circuit 18 to the φA control valve 14a. Each of the pulses 26 turns on the φA control valve 14a during a portion of each voltage half cycle. The current passing through the first-phase winding appears as is shown in dashed lines 27 on the plot 2a of FIG. 2.

Figure 2A:
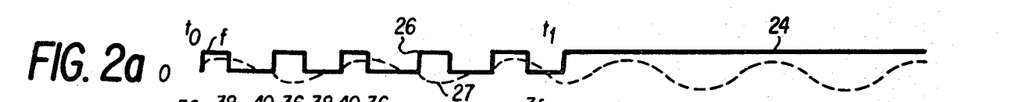
FIGS. 2a–d are diagrammatic representations of control signals in the circuit of FIG. 1.
Figure 2B:
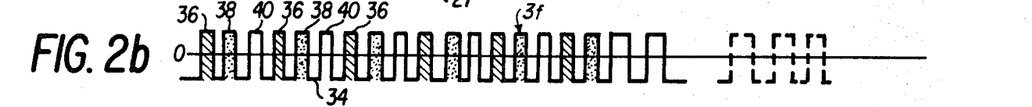

Describing now generally how this control system is adapted to provide (power factor) control to multiphase motors (specifically three phase motors), the pulsed, or continuous (for optimum phase angle), power-factor signal f provided by the φA-PF control circuit is also fed to a time-division control circuit such as an oscillator control circuit 28. If the signal is a continuous signal 24, the oscillator control circuit 28 provides a signal on a line 29 in response thereto to provide continuous signals to make φB and φC control valves 14b and c conductive. However, if the power-factor signal f is pulsed, the oscillator control circuit synchronizes a voltage control rectangular-wave oscillator 30 therewith to produce a signal having a frequency which is three times the frequency of the φA power factor signal f frequency. Feedback line 32 provides the means for the oscillator control circuit 28 to phase lock the rectangular wave oscillator to the pulsed power-factor signal 26. FIG. 2b shows the output signal 34 of the square wave oscillator 30 in its phase relationship with the pulsed power-factor signal 26. It should be noted that the initial pulse 36 in every sequence of three pulses of the oscillator output signal 34 is synchronized with the leading edge of each power-factor signal pulse 26. The intermediate pulses 38 and 40 are 120°, out of phase with each other and with the initial pulses 36. In any event, the oscillator output signal 34 is fed to φB and φC control circuits 42 which use intermediate pulses 38 and 40 to respectively regulate the "on" times of φB and φC control valves 14b and c.

The phase control valves 14a–c in the preferred embodiment, are triaces which, once they are turned "on", remain "on" until the current passing therethrough equals zero. At this point, if they are not energized with a gate signal they turn "off" until again energized with a gate signal. The power-factor pulses 26 provide gate signals to the φA control valve 14a while the intermediate pulses 38 and 40 of the oscillator provide gate signals to the φB and φC control valves 14b and c. It can be seen that the pulsed power-factor signal 26 reduces the amount of current 27 (FIG. 2a) which flows in each half cycle of the first phase winding. Similarly, the currents which flow to the induction motor 10 from φB and φC are plotted in FIGS. 2c and 2d respectively. Again, it can be seen that the intermediate pulses 38 and 40 reduce the amount of current which flows in each half cycle.

In general operation, assuming the induction motor 10 is running at an optimum power factor, the φA PF control circuit 18 detects this optimum power factor and sends a continuous signal to the φA control valve 14a, thereby turning the valve "on". This continuous signal is impressed on the oscillator control circuit 28 and, since it is impossible for the rectangular wave oscillator 30 to become synchronized with a continuous signal, the oscillator control circuit 28 detects such lack of synchronization and, in response thereto, impresses a continuous signal via line 29 on the φA and φB control valves 14b and 14c. Thus, the induction motor 10 is energized by φA, φB, and φC power sources in the normal manner.

Figure 2C:
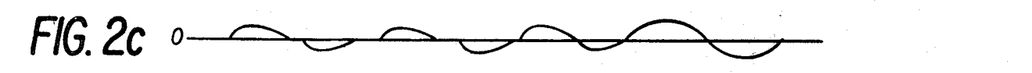
Figure 2D:
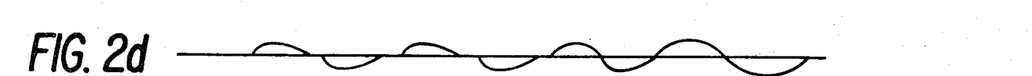

However, when the load on the induction motor 10 is reduced to such a level that the induction motor 10 is using an excessive amount of energy for its load, its current/voltage phase angle difference will increase. The increased phase angle will be detected by the φA-PF control circuit 18 and, in response thereto, a pulsed power-factor signal 26 will be impressed upon the φA control valve 14a to control each half cycle of current 44 passing therethrough as is depicted in FIG. 2a. This same power factor pulse signal 26 is fed to the oscillator control circuit 28 which phase locks a rectangular wave signal of the oscillator 30 to the pulsed power-factor signal 26. The frequency of the rectangular-wave oscillator 30 is three times the frequency of the power-factor signal and is depicted in FIG. 2b. The pulses 36 are effectively not used. Intermediate pulses 38 and 40 of the rectangular-wave oscillator signal are respectively used to control "on" times of φB and φC control valves 14b and 14c to thereby produce current signals as are depicted in FIGS. 2c and d.

Figure 3:
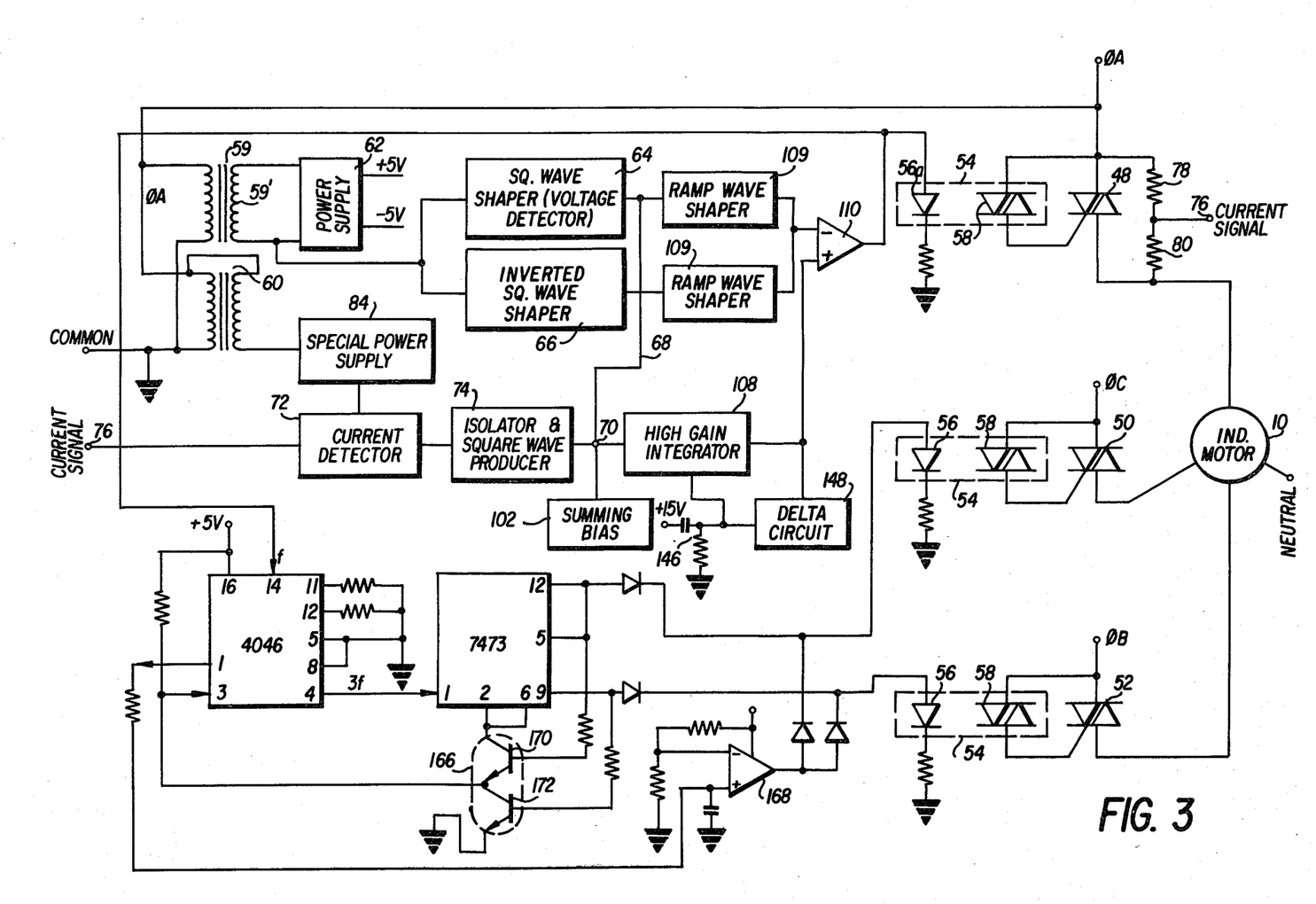
FIG. 3 is a block diagram with some elements being schematically represented therein depicting the embodiment of FIG. 1 of the invention in more detail.
Figure 4:
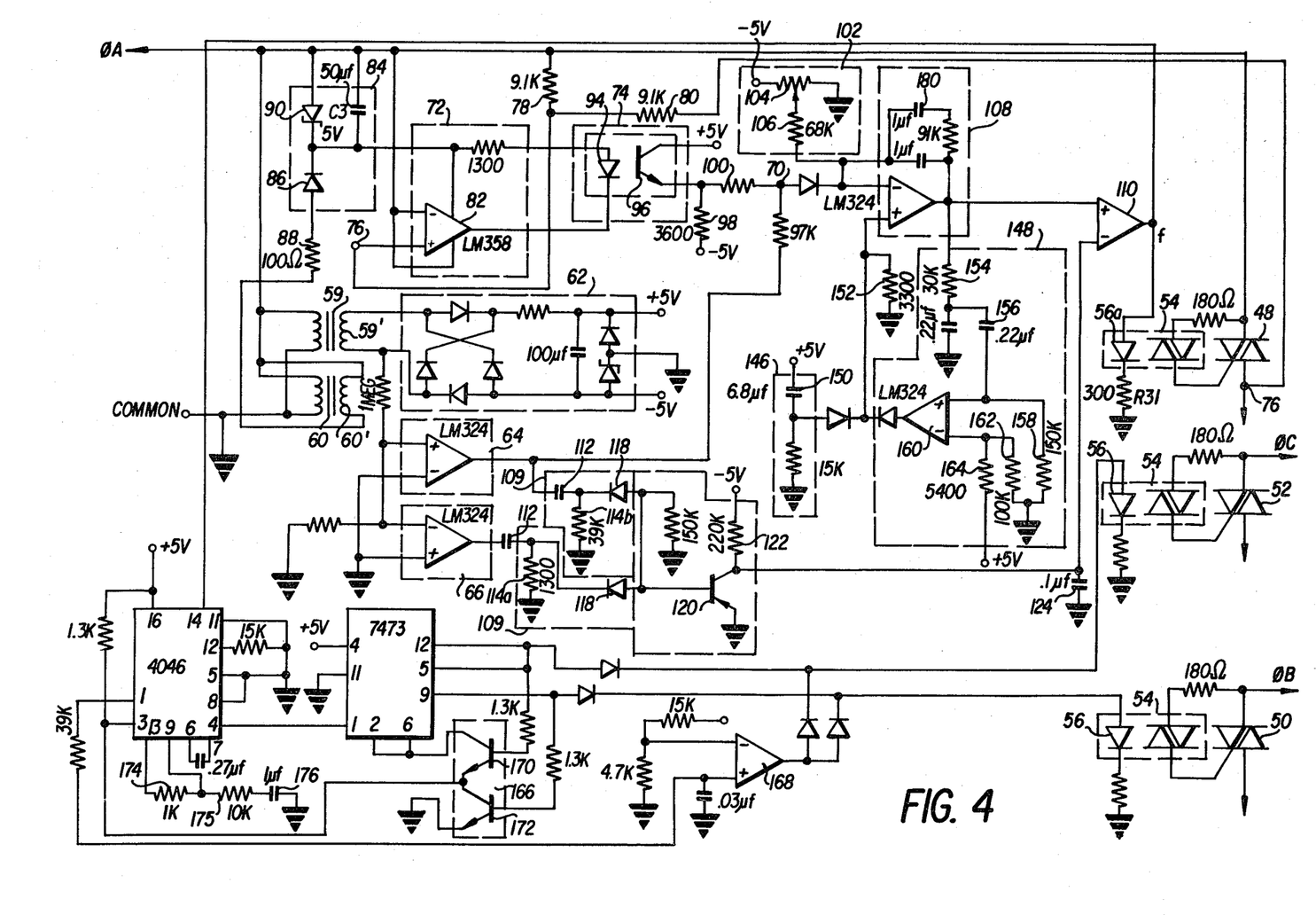
FIG. 4 is a schematic representation of the circuit of FIG. 3.

Describing next in more detail a preferred embodiment of the invention, as is depicted in FIGS. 3 and 4, with reference mainly to FIG. 3, but with particular reference being noted below to FIG. 4 to describe in detail particular elements, the induction motor 10 is energized by φA, φB, and φC power sources via triacs 48, 50, and 52, respectively. Each of these triacs is in turn gated by an optical isolator 54, each optical isolator 54 comprising a light-emitting diode 56 and a light actuated triac 58. When the light emitting diodes 56 are respectively on, their associated triac valves 48, 50, and 52 allow the passage of current from power sources φA, φB and φC. The φA voltage signal is applied to the primaries of power-supply and voltage-detection transformer 59 and to a current detector transformer 60. The primaries of the transformers are connected between the φA power source and the common of the power source, which in most cases, is connected to ground for delta connected motors and to the neutral of the wye connected motors. However, in the case of a wye connected motor, the neutral, which is the intersection of the three windings, is sometimes hard to get to. Suprisingly, it is possible, in those cases, to use the control system of this invention while letting the motor neutral float free, without coupling it to the source common or otherwise coupling it to the control circuit in any way. In this case one need not gain access to the motor neutral, however, in this mode the circuit may not control the motor 10 to run as efficiently as when connection to the motor neutral is made. This will be further explained below. The secondary 59' of transformer 59 is connected to a power supply 62, a rectangular wave shaper 64, and an inverted rectangular wave shaper 66. The power supply 62 provides +5 and −5 volt DC energy for powering the various elements of the circuit. The power supply 62 is conventional in design and, although it is shown in detail in FIG. 4, it is not thought necessary to further describe this subcircuit.

The rectangular wave shaper 64 is an LM324 operational amplifier (FIG. 4) whose positive winding is connected to the secondary 59' of transformer 59 and whose negative winding is connected to ground (the grounds shown in the circuit are all connected to "common"). This element produces a rectangular wave that is in phase with the voltage signal of $\phi A$ and corresponds to the voltage detector 20 of FIG. 1. This rectangular-wave voltage signal is fed on line 68 to a summing node 70 to be compared there with a rectangular-wave current signal indicative of current phase.

The rectangular-wave current signal is generated by a current detector 72 and an isolator and rectangular-wave producer 74 (a 4N27 optical isolator). In this respect, the current detector 72 receives a current signal at terminal 76 which is obtained from a voltage divider comprising 9.1K and 91K resistors 78 and 80 connected across the $\phi A$ triac valve 48. The current detector 72 comprising a LM358 operational amplifier 82 (FIG. 4) which is biased by a special power supply 84. The details of the special power supply 84 can be seen in FIG. 4. With reference to FIG. 4, the special power supply 84 receives a voltage between $\phi A$ and the secondary 60' of transformer 60 to develop a +5 volt power supply bias across capacitor C3 and 5 V Zener diode 90, which are connected in parallel with each other and in series with diode 86 and a 100 ohm resistor 88. The current detector 72 must have its own special power supply because it has to have a special ground (special ground being $\phi A$) to detect current in the manner described. Thus, the operational amplifier 82, and the optical isolator 74 are biased by +5 volts. The current signal is delivered to the plus, or noninverting, terminal of the operational amplifier 82 while the $\phi A$ signal is fed to the minus, or inverting, terminal. To understand operation of the current detector 72 three possible conditions must be examined as follows: (1) triac 48 is "off"; (2) triac 48 is "on" and current is toward motor 10; and (3) triac 48 is "on" and current is away from motor 10. In condition (1) the voltage drop across the inverting and noninverting terminals of operational amplifier 82 is so great that it is saturated both by positive and negative $\phi A$ voltage signals. The characteristics of the operational amplifier LM 358 are such that under these conditions, it produces an output that has a smaller voltage than the $\phi A$ +5 volt bias to turn on the LED 94. In condition (2) the operational amplifier 82 is working properly, and it reflects the negative voltage across the triac 48 to produce a negative output and thereby turn "on" the LED 94. In condition (3), the operational amplifier 82 is working properly but the negative voltage appearing across the triac 48 produces a positive output to turn "off" the LED 94. Thus, the output of the operational amplifier 82 is a rectangular-wave which activates the LED 94 of the 4N27 optical isolator 74 to turn it on for each positive current pulse through triac 48. The light therefrom is optically coupled to a light responsive transistor 96 of the optical isolator 74 to respectively turn it "on" and thereby couples a +5 volt DC voltage, via a circuit comprised of a 3.6K resistor 98 coupled to a −5 volt source and a series 80K resistor 100, to the summing node 70.

Pulses passed by the transistor 96 are indicative of $\phi A$ positive current and these pulses are compared at the summing node 70 with negative voltage pulses received from the rectangular-wave shaper 64.

Figure 5A:
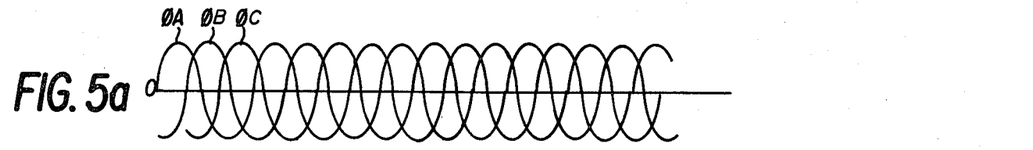
FIG. 5 is a diagrammatic representation of signals at various stages in the circuit of FIGS. 3 and 4.
Figure 5B:
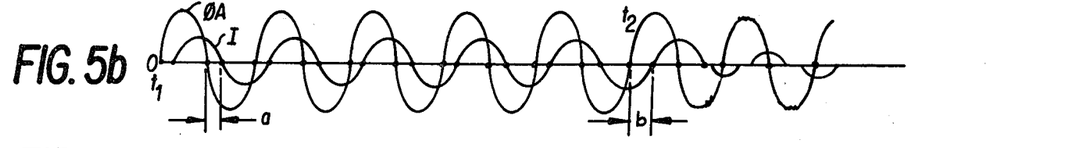

With reference to FIG. 5, FIG. 5a depicts voltage signals of $\phi A$, $\phi B$, and $\phi C$. FIG. 5b is simplified to include only the voltage signal of $\phi A$ but also includes the $\phi A$ current I. It can be seen at $t_1$ in the 5b plot that current I lags the $\phi A$ voltage by a phase angle a.

Figure 5C:
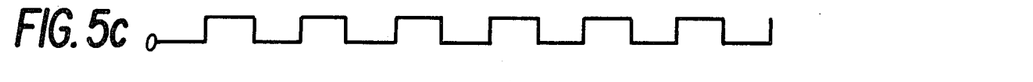
Figure 5D:
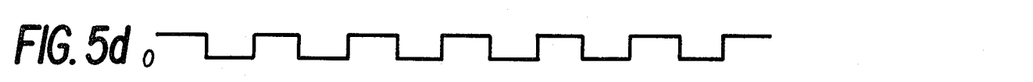
Figure 5E:
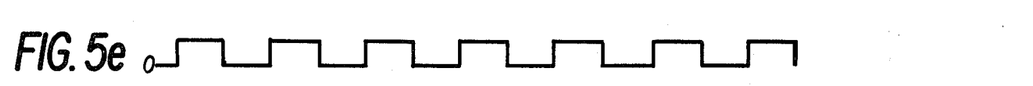
Figure 5F:
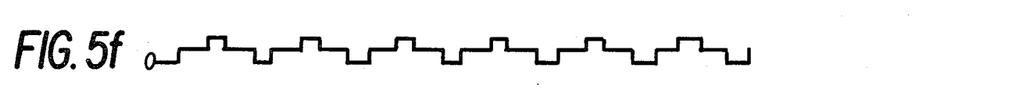
Figure 5G:
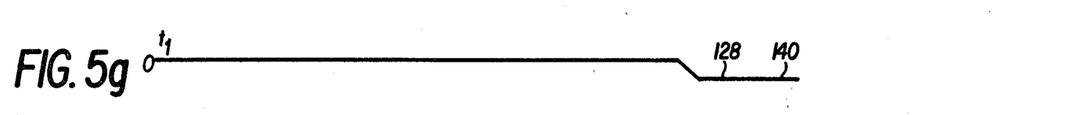

FIG. 5c depicts the rectangular-wave signal indicative of the phase of $\phi A$ voltage produced by the voltage detector and rectangular-wave shaper 64 which is presented to the summing node 70, and FIG. 5e depicts the rectangular-wave signal indicative of current phase which is fed to the summing node 70 by the current detector 72 via the isolator and rectangular-wave producer 74. These signals are summed at the summing node 70 to basically produce the signal of FIG. 5f. The sum signal of FIG. 5f is biased negatively by an adjustable summing bias 102 which, with reference to FIG. 4, comprises a variable resistor 104, and a fixed resistor 106. The purpose of this bias will become clear as the description proceeds. The signal of FIG. 5f is inverted and averaged, or flattened, by a high gain integrator 108 to appear approximately as is depicted in FIG. 5g. In this respect, for an optimum power factor, the summing node 70 is biased by the summing bias 102 to be essentially zero. It can be seen that at time $t_1$ this integrated power-factor signal is approximately zero since there is an optimum power factor at that time.

Figure 5H:
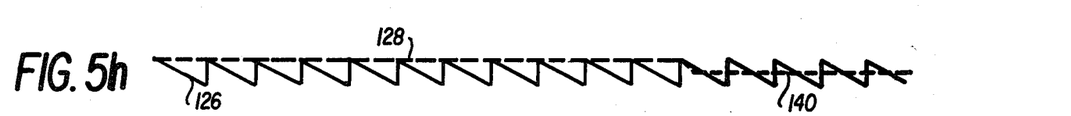
Figure 5I:
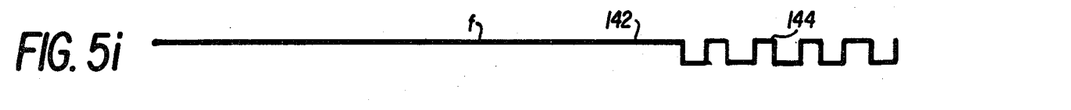

In any event, the integrated power-factor signal of FIG. 5g is compared with negative ramp signals, FIG. 5h, produced by ramp wave shapers 109, in an operational amplifier 110. Each negative ramp of the ramp signal coincides with a half cycle of the $\phi A$ voltage signal and is obtained by differentiating rectangular-wave voltage signals from the rectangular-wave shaper 64 and the inverted rectangular-wave shaper 66 with differentiators comprising 0.03 microfarad capacitors 112 and resistors 114a and b (FIG. 4). It should be noted that the differentiator resistors 114a and b are of widely different values (1300 ohms and 39k) in order to equalize the effects of the ramp signals when they are compared with the somewhat irregular signal of FIG. 5g (although it does not appear to be irregular in FIG. 5g). These differentiated signals are passed through diodes 118 to be combined to drive a 2N2907 transistor 120. A −5 volts potential is attached to the collector of the transistor 120 across a 220K resistor 122 to produce the negative ramp signal across a 0.1 microfarad capacitor 124 which is fed to the inverting terminal of the operational amplifier 110. This negative-voltage ramp signal is designated 126 in FIG. 5h and, in that same figure, the integrated power factor signal 128 is shown superimposed on the the negative-voltage ramp signal 126.

In this respect, it can be seen in the plots of FIG. 5 that the voltage/current phase difference of the $\phi A$ winding is "a" at time $t_1$, but at time $t_2$ the phase angle is increased to "b." While the induction motor 10 is operating at the optimum power factor for phase angle "a" the integrated power-factor signal 128 is positive relative to the ramp signal 126 and because of this the operational amplifier 110 puts out a continuous positive signal, which drives the LED 56a through a 300 ohm resistor R31. Thus, the LED 56a remains "on" to maintain triac 48 in a conducting condition to allow all of the power from φA into the motor winding associated therewith. However, at time t₂, when the phase difference increases to "b", the inverted integrated power-factor signal 128 increases (goes negative) an additional amount as is depicted at 140 in FIG. 5h. Now the ramp signal 126 is often more positive than the inverted integrated power factor signal 128 such that the operational amplifier 110 does not put out a continuous φA control signal 142 (FIG. 5i), but rather puts out a pulsing φA control signal 144 as is depicted in FIG. 5i. The pulses 144 correspond to periods when the ramp signal 126 is negative relative to the integrated power-factor signal 128. It will be appreciated that the distance between the following edges of the pulses 144 are equal, however, since the pulses do not have equal widths, the distances between the leading edges are not necessarily equal. The pulses 144, as can be seen in FIG. 5b, serve to make the triac 48 conductive during the remaining portion of each half cycle until the current passing therethrough again goes to zero. Thus, once the phase angle increases to a predetermined amount, thereby indicating an unduly small load on the induction motor 10, the amount of electrical current fed to the φA winding of the induction motor 10 is reduced to thereby conserve energy.

Before describing how the φA power factor signal is employed to control the triacs 50 and 52 of the φB and φC power supplies, a bootstrap circuit 146 and a delta circuit 148 will be described. Both of these circuits are coupled to the high gain integrator 108 and basically determine the bias voltage at the non-inverting terminal of its operational amplifier.

In the case of the bootstrap circuit 146, this is a differential circuit which delivers +5 volts to the operational amplifier's non-inverting terminal upon motor "start up" to thereby insure that the integrated power-factor signal 128 remains positive relative to the ramp signal 126 during start up so that the motor can obtain full power. After a time, a timing capacitor 150 in the bootstrap circuit decreases the +5 volts appearing at the non-inverting terminal of the operational amplifier 108 until finally this terminal reaches a ground level through 3.3K resistor 152.

The delta circuit 148 recognizes a rapid change in the voltage on the output of the operational amplifier 108 through a 30K resistor 154 and a 0.22 microfarad capacitor 156. A 150K resistor 158 bleeds voltage from the capacitor 156. This changing voltage signal is applied to the non-inverting input of a LM324 operational amplifier 160. With a large voltage change you get a signal at this non-inverting input of the delta operational amplifier 160. The response of the operational amplifier is determined by a bias set at the other input by a 100 Ohm resistor 162 and a 5.4K Ohm resistor 164. When the integrator 108 puts out a large increase in voltage the operational amplifier 160 is thereby caused to saturate the integrator operational amplifier 108 to insure that the power factor signal is well above the ramp signal so that the operational amplifier 110 holds the triac 48 conducting to apply all available power from φA.

Turning next to describing the circuit which employs the output of operational amplifier 110 to control the "on" times of triacs 50 and 52 for each half cycle applied thereto, this circuit basically comprises an integrated circuit 4046, an integrated circuit 7473, an "AND" gate 166, and an operational amplifier 168.

I.C. 4046 receives the φA control signal f at its terminal 14. This integrated circuit comprises the rectangular-wave voltage-controlled oscillator 30 (FIG. 1) which produces a rectangular-wave output on terminal 4 having a frequency three times that of a pulsed φA control signal f received at terminal 14. This 3f signal is fed to terminal 1 of the I.C. 7473. I.C. 7473 is basically a counter, or flip-flop, circuit, which takes no action relative to this invention upon receiving an initial pulse 36 (FIG. 2b), however, upon receiving a second pulse 38, it provides a high signal at pin 12. The third input pulse 40, in a sequence of three pulses, produces a high at terminal 9 and joins with the high at terminal 5 to change terminal 12 to a low. There is an instant when simultaneous highs on pins 12 and 9 exist which cause 2N22222 transistors 170 and 172 of the AND gate 166 to conduct and thereby reset I.C. 7473. In addition, conduction of transistor 172 is fed back as a voltage drop to pin 3 of the I.C. 4046. I.C. 4046 controls its oscillator to be synchronized with the signal appearing at terminal 3 but to have a frequency three times as great. The signal appearing at terminal 3 is internally compared with the signal appearing at pin 14 and an error signal is sent out on pin 13. In this respect, terminal 13, is connected to ground via an integrator including a 1K resistor 174, a 10K resistor 175 and a 1 microfarad capacitor 176. The intersection of the resistors 174 and 175 is connected to a V.C.O. input terminal 9 of the I.C. 4046. Thus, the signal appearing at terminal 13, after being integrated is fed to the terminal 9 which controls the oscillator in the proper frequency synchronization. If the oscillator of I.C. 4046 losses sychronization with the power factor signal f, I.C. 4046 provides a low at its terminal 1. This low is transmitted to operational amplifier 168 which, in turn, provides continuous high signals to LEDs 56 of optical isolators 54 to thereby produce conduction of φB and φC triacs 50 and 52.

Describing operation of the φB and φC control system, the oscillator of IC 4046 is synchronized with a pulsed φA control signal f received from op amp 110. This signal is shown in FIG. 2a. The oscillator of I.C. 4046 produces signal 3f (FIG. 2b) at terminal 4, which signal is fed to terminal 1 of I.C. 7473. I.C. 7473 produces high signals at terminal 12 only on the second pulse of each three pulse sequence and on terminal 9 only on the third pulse of each three pulse sequence. Thus, signals fed by terminals 12 and 9 of I.C. 7473 to drive triacs 50 and 52 are 120°, out of phase with each other and with pulse signals that drive triacs 48 of φA. Should there be no pulsed control signal for φA, but rather a continuous signal to hold triac 48 closed, I.C. 4046 realizes that there is no longer synchronization and therefore applies a low to its terminal 1 which is transferred via operational amplifier 168 to continuously drive triacs 50 and 52 of φC and φB.

Figure 6:
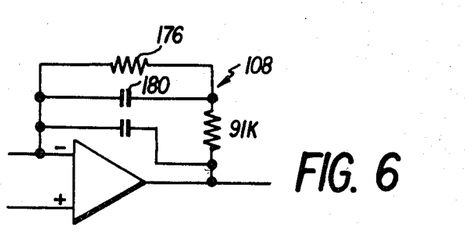
FIG. 6 is a schematic representation of a portion of the FIGS. 3 and 4 circuit, but with a modification; and, FIG. 7 is a schematic representation of a portion of the circuit of FIGS. 3 and 4 illustrating the manner in which the circuit is connected for a delta motor.

The above described system can be used with the common and grounds thereof either tied to the motor neutral or not, the summing bias 102 being adjustable to allow it to be done either way. If it is desired to not tie the control system to the motor's neutral, a minor modification of the circuit is desirable. In this respect, the high gain integrator 108 should include a 250K resistor 178 connected in parallel with its feedback capacitor 180, as is shown in FIG. 6. This resistor provides degenerative feedback and reduces sensitivity. In any case, the circuit provides greater efficiencies if it is connected to the motor's neutral.

It will be appreciated by those skilled in the art that the invention described herein provides a multi-phase power-factor control system for an AC induction motor which is relatively easy to install and which works efficiently. The system does not contain an undue multiplicity of expensive elements, and does not require connection to the neutral of the motor.

In addition, this system includes a highly beneficial motor-winding current-phase monitor which can be used for both multi-phase and single-phase motors in a power-factor control system. The current-phase monitor of this invention measures voltage drop across a triac and is isolated from following components by an optical isolator.

While the invention has been particularly shown and described with reference to a preferred embodiment, it will be understood by those skilled in the art that various changes in form and detail may be made therein without departing from the spirit and scope of the invention. For example, although in the preferred embodiments triacs 48, 50 and 52 are used as control valves for controlling the current flowing to the induction motor 10, these elements could be any of a family of triac-like, or thyristor, switches including ignitrons. In this respect, the claims which hereinafter follow designate all such similar elements as being triac-like valves.

Figure 7:
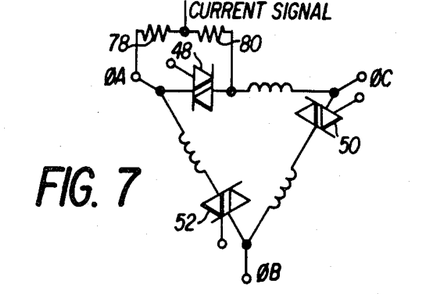

In delta connected motors each of the triacs 48, 50 and 52 are connected inside the delta circuit in series with each motor winding, as is depicted in FIG. 7. In other respects, the circuit is as previously described.

Also, it would be possible to drive the oscillator 30 at a frequency that is 6, 9 etc. times as fast as the frequency of the first-phase pulsed control signal f, so long as this multiple is divisible by the number of different phase windings.

Also, the oscillator 30 output could be used to drive all three of the control valves 14a-c rather than using the output of the $\phi A$ PF control circuit 18 to drive valve 14a. In this respect the first pulse of the oscillator 30 output, in any three pulse sequence, is synchronized with a pulse from the $\phi A$ PF control circuit 18 in any case so, in effect, the pulse from the $\phi A$ PF control circuit 18 is still being used to control valve 14a. However, this arrangement does not currently appear to be as stable as the one described herein.

Still further, although in the preferred embodiment described above both the current and voltage detectors sense conditions at the first-phase, or OA winding, this is not essential. In this respect, this invention also works if the voltage detector senses the voltage source for the phase B or phase C windings. That is, other voltage sources for the motor can be compared with the current in the first-phase winding to get an indication of a motor's power factor. The summing bias 102 can be adjusted to accommodate these different modes of operation.

The embodiments of the invention in which an exclusive property or privilege are claimed are defined as follows:

1. A multi-phase control system for an AC induction motor comprising:
   a current sampling means including means adapted to be placed in circuit with a first-phase winding of said multi-phase motor for providing an output signal indicative of the phase of current drawn by said first phase winding;
   a voltage sampling means adapted to sense a voltage signal of an electrical input to said motor and for providing an output signal indicative of the phase of said voltage signal;
   a phase-difference detection means responsive to the output signals of said current sampling means and said voltage sampling means for providing an output signal which varies in accordance with the phase difference between said current and said voltage signals;
   a first control means adapted to be electrically connected in series with said first phase winding of said motor, and responsive to the output signal of said phase difference detection means for varying the duration of "on" time of each cycle of input power to said first-phase winding inversely to the difference in phase between said current and said voltage signals; and,
   at least a second control device respectively adapted to be electrically connected in series with a second-phase winding of said multi-phase motor, and responsive to the output of said phase detection means for varying the duration of "on" time of each cycle of input power to said second-phase winding inversely to the difference in phase between said current and said voltage signals, wherein said phase-difference detection means produces first-phase control pulses to gate said first control means, each pulse determining the on time of a half-cycle of input power to said first-phase winding, and wherein is further included logic circuitry coupling said phase-difference detection means to said second control device, said logic circuitry including a frequency-multiplying means for frequency multiplying the first-phase control pulses to create further pulses, a phase-lock means for phase locking said further pulses to said first-phase control pulses and a distributing means for distributing some of these further pulses to said second control device to be thereby used as control pulses for said second control device.

2. A multi-phase control system as in claim 1 wherein said voltage sampling means senses a source voltage to be fed to the first-phase winding.

3. A multi-phase control system as in claim 1, wherein said first control means is a triac-type switch and wherein said current sampling means produces said signal indicative of the phase of the current by monitoring the voltage drop across the triac-type switch and wherein said current sampling means is coupled to said phase-detection means by an optical isolator.

4. A multi-phase control system as in claim 1 wherein said current sampling means is coupled to said phase detection means by an optical isolator.

5. A method of controlling power applied to a multi-phase AC induction motor comprising the following steps:
   sampling current flowing through a first winding of the AC induction motor and thereby determining its phase;
   sampling a voltage signal applied to said AC induction motor and thereby determining its phase;
   comparing the phases of said current flowing through said first phase winding with the phase of said voltage applied to said motor and producing a first pulse signal representative of the difference between said compared phases;
   utilizing the first pulse signal to vary the duration of "on" time of each cycle of input power to said first-phase winding inversely to the difference in phase between said current and said voltage;

multiplying said first pulse signal to create a second pulse signal having a frequency that is a multiple of the frequency of the first pulse signal by a factor which is a multiple of the number of phase windings; and, phase locking said second pulse signal to said first pulse signal; and, using pulses from said second pulse signal for varying the duration of "on" times of each cycle of input power to each additional different-phase winding.

6. A method as in claim 5 wherein said second pulse signal has a frequency that is a multiple of the frequency of said first-phase signal winding by a factor that is a multiple of the number of different phase windings, and including the substep of employing intermediate pulses of said phase locked second-pulse signal to determine the beginning of "on" times of said additional different-phase windings.

7. A method as in claim 5 wherein said voltage-sampling step is accomplished by sampling voltage applied to said first-phase winding.

8. A method as in claim 5 wherein said pulses are applied through optical isolators to vary the duration of "on" times of each cycle of input power.

9. A multi-phase control system for an AC induction motor comprising:

a motor load sensing device coupled to the AC induction motor to produce first-phase control pulses in phase with a line signal energizing a first-phase winding, but whose duty cycle varies directly to motor loads;

a first control means adapted to be electrically connected in series with said first-phase winding of said motor, and responsive to said first-phase control pulses for varying the on time of each cycle of input power to said first-phase winding directly to motor load; and at least a further control device respectively adapted to be electrically connected in series with a second-phase winding of said multi-phase motor for varying the duration of "on" time of each cycle of input power to said second-phase winding directly to motor load;

wherein said motor load sensing device produces said first-phase control pulses to gate said first control means, each pulse determining an on-to-off time ratio of input power to said first-phase winding, and wherein is further included logic circuitry coupling said motor load sensing device to said further control device, said logic circuitry including a frequency multiplying means for receiving said first-phase control pulses and frequency multiplying these pulses to create a number of further pulses, said logic circuitry also including a phase lock loop circuit for phase locking said further pulses to said first-phase control pulses, said logic circuitry also including a diverting system for diverting some of these further pulses to said further control device to thereby be used as control pulses.

10. A multi-phase control system as in claim 9 wherein said frequency multiplying means includes an oscillator which is synchronized with said first-phase control pulses but which has a frequency that is a multiple of the frequency of the first-phase pulse signal by a factor which is a multiple of the number of phase windings, a first further pulse produced by said oscillator positionally related with a pulse of a first-phase control pulse, and a second pulse being used for controlling the "on" time of said further control device.

11. A multi-phase control system as in claim 10 wherein said logic circuitry reponds to an inability to synchronize its oscillator to a first-phase pulse control signal by placing said further control device in a "conducting" or "on" state.

12. A multi-phase control system as in claim 9 wherein there are three phase windings, each of said windings having a control device respectively connected in series therewith, said logic circuitry coupling said motor load sensing device to said second and third control devices, said motor load sensing device producing first-phase control pulses to gate said first control means, and said logic circuitry providing second- and third-phase pulses that are 120° out of phase with each other and with said first-phase control pulses to respectively gate said second and third control devices.

13. A multi-phase control system as in claim 12 wherein said logic circuitry responds to an inability of said phase lock means to synchronize second- and third-phase control pulses to first-phase control pulses by placing said second and third control devices in conducting states.

14. A multi-phase control system as in claim 12 wherein the connection between said motor load sensing device and said first control device is via optical isolators, and the connection between said logic circuitry and said second and third control devices is via optical isolators.

15. A multi-phase control system as in claim 9 wherein the connection between said motor load sensing device and said first control means is via optical isolators, and the connection between said logic circuitry and said further control device is via optical isolators.

* * * * *